United States Patent [19]
Chou

[11] Patent Number: 5,571,922
[45] Date of Patent: Nov. 5, 1996

[54] REACTIVE DILUENT ALDIMINE OXAZOLIDINES

[75] Inventor: Chih-Yuch Chou, Elk Grove, Ill.

[73] Assignee: Angus Chemical Company, Buffalo Grove, Ill.

[21] Appl. No.: 556,025

[22] Filed: Nov. 13, 1995

Related U.S. Application Data

[62] Division of Ser. No. 143,470, Oct. 26, 1993, Pat. No. 5,466,769.

[51] Int. Cl.⁶ .................... C07D 263/02; C07D 413/00
[52] U.S. Cl. ................ 548/215; 564/271; 564/278
[58] Field of Search ................ 548/215; 564/271, 564/278

[56] References Cited

U.S. PATENT DOCUMENTS

| | | | |
|---|---|---|---|
| 3,743,626 | 7/1973 | Emmons | 260/77.5 |
| 4,046,744 | 9/1977 | Jenkins | 260/77.5 |
| 4,054,717 | 10/1977 | Gill | 428/452 |
| 4,192,786 | 3/1980 | Shibayama et al. | 260/18 |
| 4,504,647 | 3/1985 | Zabel et al. | 528/68 |
| 4,874,805 | 10/1989 | Mülhaupt | 524/188 |
| 5,104,955 | 4/1992 | Mathai | 526/323.2 |
| 5,214,086 | 5/1993 | Mormile et al. | 524/237 |
| 5,223,174 | 6/1993 | Chou et al. | 252/194 |

FOREIGN PATENT DOCUMENTS 3019356  11/1981  Germany .

OTHER PUBLICATIONS

Preliminary Technical Data Sheet, Aldimine Oxazolidine Reactive Diluent, CAS Registry No. 148348–13–4.

*Primary Examiner*—John C. Bleutge
*Assistant Examiner*—Randy Gulakowski
*Attorney, Agent, or Firm*—Arnold, White & Durkee

[57] ABSTRACT

An aldimine oxazolidine compound having the formula:

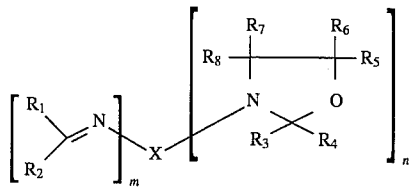

wherein: $R_1$, $R_2$, $R_3$, $R_4$, $R_5$, $R_6$, $R_7$ and $R_8$ are, individually, a hydrogen atom, a methyl or methylol group, an ethyl or ethylol group, a straight chain or branched chain alkyl or alkanol group, a cycloalkyl group, or an aryl group, including groups substituted by nitro, halogen, thiol and amino functional groups, such that when $R_5$, $R_6$, $R_7$ and $R_8$ are hydrogen atoms, $R_3$ and $R_4$ are not hydrogen atoms; m and n are integers of one to five; and X is zero or a $-R_9-Y-R_{10}-$ group, wherein $R_9$ and $R_{10}$ are, individually, a methylene group, an ethylene group, a straight chain or branched chain alkylene group, a cycloalkylene group, or an arylene group, including groups substituted by nitro, halogen, thiol and amino functional groups, and Y is zero or an (m+n)-valent methylene group, ethylene group, straight chain or branched chain alkylene group, cycloalkylene group, or arylene group, including groups substituted by nitro, halogen, thiol and amino functional groups. The compound is admixed with a preparation to reduce volatile organic content of the preparation and improve rheological properties of the preparation.

6 Claims, No Drawings

REACTIVE DILUENT ALDIMINE OXAZOLIDINES

This application is a divisional of application Ser. No. 08/143,470, filed Oct. 26, 1993, now U.S. Pat. No. 5,466, 769 on Nov. 14, 1995.

BACKGROUND OF THE INVENTION

1. Field Of The Invention

The present invention is generally related to aldimine oxazolidine compounds and methods of using the compounds as reactive diluents. In particular, the present invention relates to methods of reducing volatile organic content (VOC) in a preparation and improving rheological properties of the preparation.

2. Background Of The Art

Polyurethane coatings are extensively used as commercial and industrial protective and/or decorative coatings. Polyurethane coatings, known in the industry as one of the toughest coatings available, are routinely applied as protective coatings on exterior walls of buildings, industrial machinery, military equipment and vehicles, commercial and passenger vehicles, and any other surface requiring a protective coating. Polyurethane systems are also used extensively as sealants and adhesives.

Polyurethane coating systems generally include an isocyanate component (i.e., polyisocyanates or prepolymers) and multifunctional monomers, oligomers and polymers. These systems also include pigments, organic solvents, and a variety of adjuvant components, e.g., surface active agents, dispersants, diluents, and fillers. Restrictions on solvent content in the atmosphere have increased efforts to provide coatings which do not contain any volatile components, but instead include components which form either the whole or a part of the hardened film itself.

Reactive diluents are used to lower the volatile content of the coatings by reducing the loss of organic solvents into the atmosphere. For purposes of the present invention, reactive diluents are compounds of low volatility which reduce the viscosity and VOC of a coating, adhesive, elastomer, epoxy or sealant formulation and become a permanent part of the formulation through chemical reaction. Accordingly, reactive diluents are added to coatings not only as a diluent, but to reduce viscosity, copolymerize with the oligomers and polymers to form a part of the coating, and contribute to the final properties of the cured film.

Some reactive diluents pose problems which limit their use in coatings. The diluents are known to produce brittle films with severe shrinkage and poor adhesion to substrates, exhibit slow cure response, poor solvency effects or color instability, ineffectively reduce viscosity, or cause serious skin irritancy problems.

Oxazolidine compounds have been used as curing and crosslinking reagents, reacting with polyfunctional isocyanates in the presence of polyols or water to form polymeric coatings. U.S. Pat. No. 4,101,527 discloses an equimolar reaction of an oxazolidine with a polyfunctional isocyanate in the presence of water to form a polyurethane coating. U.S. Pat. No. 3,941,753 describes pre-polymers for coating formation prepared from the reaction of a ketiminoalkanol with an isocyanate. Monocyclic and bicyclic oxazolidine compounds are also used as moisture scavengers in formulating polyurethane coatings as disclosed in U.S. Pat. No. 5,223, 174 and U.S. patent application Ser. No. 07/624,062 now U.S. Pat. No. 5,246,148.

U.S. Pat. No. 4,504,647 describes aldimine oxazolidine compounds as curing agents which exhibit a long shelf life when mixed with isocyanate. However, the mixture cures very quickly into an elastic or hard polymer in the presence of water or humidity. Coatings require an adequate potlife in order to be used commercially as automotive refinish coatings and the like. Coatings such as those described in U.S. Pat. No. 4,504,647 rapidly react with water to form a gel. These coatings have a short potlife which can prevent use of the coating formulation in typical commercial applications.

There is a need for a reactive diluent which exhibits good cure response, color stability, an adequate potlife, low intrinsic viscosity, low film shrinkage, and excellent solvating or viscosity reducing properties.

SUMMARY OF THE INVENTION

The present invention provides an aldimine oxazolidine compound having the formula:

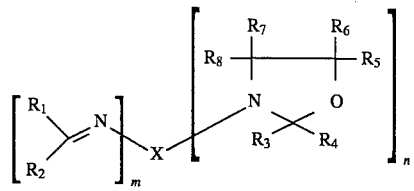

wherein: $R_1$, $R_2$, $R_3$, $R_4$, $R_5$, $R_6$, $R_7$ and $R_8$ are, individually, a hydrogen atom, a methyl or methylol group, an ethyl or ethylol group, a straight chain or branched chain alkyl or alkanol group, a cycloalkyl group, or an aryl group, including groups substituted by nitro, halogen, thiol and amino functional groups, such that when $R_5$, $R_6$, $R_7$ and $R_8$ are hydrogen atoms, $R_3$ and $R_4$ are not hydrogen atoms; m and n are integers of one to five; and X is zero or a —$R_9$—Y—$R_{10}$— group, wherein $R_9$ and $R_{10}$ are, individually, a methylene group, an ethylene group, a straight chain or branched chain alkylene group, a cycloalkylene group, or an arylene group, including groups substituted by nitro, halogen, thiol and amino functional groups, and Y is zero or an (m+n)-valent methylene group, ethylene group, straight chain or branched chain alkylene group, cycloalkylene group, or arylene group, including groups substituted by nitro, halogen, thiol and amino functional groups.

A further aspect of the invention is directed to a composition comprising an aldimine oxazolidine compound as described above and an isocyanate. Another aspect of the invention is directed to a method of reducing volatile organic content of a preparation and improving rheological properties of the preparation using a reactive diluent. An effective amount of the reactive diluent compound described above is admixed with the preparation. Preferably, from 5 to about 30 wt. % of the compound is added based on the total weight of the preparation.

DETAILED DESCRIPTION OF THE INVENTION

The present invention provides a reactive diluent which can be advantageously used in the formulation of specialty polyurethane preparations including sealants, adhesives, elastomers, coatings and epoxy resin formulations. For the purposes of the present invention, a coating is any polyurethane coating, including both one and two component coatings. These coatings are typically cured by moisture, ambient, thermal, forced dry, radiation or bake curing. The reactive diluent reacts to become part of the preparation in order to reduce volatile organic content of the preparation. The reactive diluents when added to polyurethane formulations maintain or prolong the potlife of the formulation while providing good cure response. The compounds also provide the formulations with improved consistency and application properties by improving the solvency effects (i.e., the degree to which a solvent holds a resin or other paint binder in solution) in the urethane formulations.

The aldimine oxazolidine compounds of the present invention have the formula:

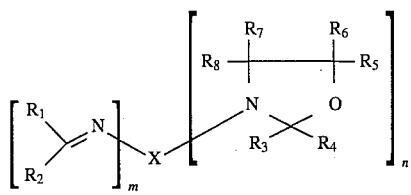

wherein: $R_1$, $R_2$, $R_3$, $R_4$, $R_5$, $R_6$, $R_7$ and $R_8$ are, individually, a hydrogen atom, a methyl or methylol group, an ethyl or ethylol group, a straight chain or branched chain alkyl or alkanol group, a cycloalkyl group, or an aryl group, including groups substituted by nitro, halogen, thiol and amino functional groups, such that when $R_5$, $R_6$, $R_7$ and $R_8$ are all hydrogen atoms, neither $R_3$ nor $R_4$ are hydrogen atoms; m and n are integers of one to five; and X is zero or a —$R_9$—Y—$R_{10}$— group, wherein $R_9$ and $R_{10}$ are, individually, a methylene group, an ethylene group, a straight chain or branched chain alkylene group, a cycloalkylene group, or an arylene group, including groups substituted by nitro, halogen, thiol and amino functional groups, and Y is zero or an (m+n)-valent methylene group, ethylene group, straight chain or branched chain alkylene group, cycloalkylene group, or arylene group, including groups substituted by nitro, halogen, thiol and amino functional groups.

All R group substituents which improve the performance of the reactive diluent aldimine oxazolidine compounds are preferred. The structure of the R substituents in the aldimine oxazolidines is determined by the selection of the reactant precursor compounds. In one preferred embodiment of the invention, the $R_1$, $R_2$, $R_5$, and $R_6$ substituents are, individually, a hydrogen atom, a methyl or methylol group, an ethyl or ethylol group, or a straight chain or branched chain alkyl or alkanol group. The $R_3$, $R_4$, $R_7$ and $R_8$ substituents are, individually, a methyl or methylol group, an ethyl or ethylol group, a straight chain or branched chain alkyl or alkanol group, a cycloalkyl group, or an aryl group, and m and n are one. X is a —$R_9$—Y—$R_{10}$— group, wherein $R_9$ and $R_{10}$ are, individually, a methylene group, an ethylene group, or a straight chain or branched chain alkylene group, and Y is zero. Most preferably, the $R_1$, $R_2$, $R_5$, and $R_6$ substituents are, individually, a hydrogen atom, a methyl group, an ethyl group, or a straight chain or branched chain alkyl group. The $R_3$, $R_4$, $R_7$ and $R_8$ substituents are, individually, a methyl group, an ethyl group, or a straight chain or branched chain alkyl group, and m and n are one. X is a —$R_9$—Y—$R_{10}$— group, wherein $R_9$ and $R_{10}$ are, individually, a methylene group, an ethylene group, or a straight chain or branched chain alkylene group, and Y is zero.

In a specific embodiment of the invention, α,α-4,4-tetramethyl-2-(methylethyl)-N-( 2-methylpropylidene)-3-oxazolidine ethanamine is prepared by reacting 2-[(2-amino- 2-methylpropyl)-amino-2-methyl-1-propanol with isobutyraldehyde. Detailed protocols for synthesizing the reactive diluent compound are described herein.

A further aspect of the invention is directed to a composition including an aldimine oxazolidine compound of the present invention in combination with an isocyanate. The composition is preferably a coating, ink, adhesive, elastomer, sealant or epoxy resin formulation in which an effective amount of the reactive diluent compound is intimately admixed with the formulation as a substitute for volatile organic solvents. The reactive diluent compound reacts to form a part of a high solids formulation while reducing the release of volatile organics into the atmosphere. An effective amount of the reactive diluent compound of the present invention is an amount sufficient to reduce the viscosity and volatile organic content of the preparation and provide an acceptable potlife or stability and cure rate while maintaining or improving the film properties of the preparation. The quantity of reactive diluent in the composition will vary with the viscosity and volatile organic content of the formulation. Generally, the effective amount will range from about 1 to about 80 weight percent based on the total weight of the formulation. In a preferred embodiment, the effective amount includes from about 5 to about 50 weight percent of the compound based on the total weight of the formulation. Most preferably, from about 5 to about 30 weight percent of the compound based on the total weight of the formulation is added. Film properties which may be improved by the reactive diluent compounds of the present invention include, but are not limited to, color stability, gloss, hardness, impact resistance, flexibility, chemical resistance, abrasion resistance, exterior durability, humidity and salt fog resistance.

The isocyanates of the composition include those conventionally used in forming polyurethane coatings as described in U.S. Pat. No. 3,743,626. Since the isocyanate component reacts with even trace amounts of moisture, extreme care must be taken so that the isocyanates do not contact water until the formulation is to be used. The formulation may be dehydrated prior to addition of the isocyanate through the use of drying equipment or moisture scavengers.

The solvents generally used in the formulation of specialty polyurethane systems are also compatible with the reactive diluent compounds of the present invention. Solvents generally used in the preparation of polyurethane preparations including aprotic solvents, such as ketones, esters, ethers, nitroparaffins, glycol esters, glycol ether esters, halogenated hydrocarbons, and alkyl and aromatic hydrocarbons can be added to the formulation.

A further aspect of the present invention is directed to a method of reducing volatile organic content of a preparation and improving rheological properties of the preparation using a reactive diluent. An effective amount of the reactive diluent compound of the present invention is substituted for the volatile organic solvents or higher viscosity polyols and reacts to form a part of the preparation as discussed above. Greater amounts of the reactive diluent compound are added to further reduce the viscosity and/or volatile organic content of the preparation.

Pigments, fillers, and adjuvants can be added to the compositions. For the purposes of this invention the term "fillers" is intended to include those non-reactive materials added to a coating preparation to increase the solids content of the coating. The term "adjuvants" is intended to include those materials which are added to the coating formulation to aid application or formation, such as surface active agents, anti-settling agents, diluents, suspending agents, dispersants, flow additives, UV inhibitors and the like.

The following examples are presented to describe preferred embodiments and utilities of the present invention and are not meant to limit the present invention unless otherwise stated in the claims appended hereto.

EXAMPLES

Example 1

Preparation of
2-[2-Amino-2-methylpropyl)-amino]-2-methyl-1-propanol

2-Amino methyl propanol (AMP, 362.2 grams; 4.0 moles) was added to a 2-liter resin flask with a four neck top, equipped with a magnetic stirrer, a thermocouple, an additional funnel and a stopper at room temperature under nitrogen atmosphere. The AMP was heated to 40° C. and then solid 95% paraformaldehyde (HCHO, 127.5 grams, 4.0 moles) was added batch-wise in about five minutes. The reaction temperature rose slowly to 45° to 50° C. due to the exotherm. The resultant slurry gradually became a clear solution in about 30 minutes at this temperature. This clear solution was allowed to stir for an additional hour to complete the oxazolidine formation. 2-Nitropropane (2-NP, 337.0 grams, 3.6 moles) was added through the addition funnel to the warm oxazolidine solution dropwise over the course of about one hour in such a manner that the pot temperature was between 45° to 50° C. The resulting light yellow solution was allowed to stir for another hour at 45° to 50° C. The reaction mixture was gradually cooled to room temperature. However, in order to prevent solidification of nitro amino alcohol (NAA), 400 ml of methanol was added when the solution temperature was 30° to 35° C. The resultant solution (NAA/MeOH, 1137.6 grams) was used for hydrogenation without further purification.

A 2-liter autoclave charged with Raney nickel (A-7000, 20 grams) in 300 ml methanol was pressurized with 600 psi hydrogen and agitated at 600 rpm. The autoclave was heated to 50° C. Part of the aforementioned nitro amino alcohol (NAA, 557.4 grams) was then incrementally fed to this autoclave through a mechanical pump over a period of two hours. During the addition, the reaction temperature was maintained at 50° C. through a Parr controller. After the addition, the reaction temperature was kept under the same condition (600 psi, 600 rpm and 50° C.) for an additional hour. The resultant amino aminoalcohol/methanol solution was cooled to room temperature and filtered through a glass fiber filtering paper to remove the Raney nickel catalyst. The methanol/water filtrate of the desired amino aminoalcohol was stripped of methanol/water under ambient pressure, followed by vacuum stripping of other low boiling impurities. A viscous light yellow liquid product was obtained. This crude material was used for the oxazolidine formation without further purification.

Example 2

Preparation of
α,α-4,4-tetramethyl-2-(methylethyl)-N-(2-methylpropylidene)-3-oxazolidine ethanamine The crude amino aminoalcohol (131 grams, about 90%, 0.74 mole) obtained from Example 1 was transferred to a one liter, four necked round bottom flask, equipped with a mechanical stirrer, a thermocouple, a Dean-Stark trap (20 ml capacity) with a Friedrich condenser on top, and an addition funnel under nitrogen atmosphere. The viscous liquid was heated to 40° C. and isobutyraldehyde (IBA, 152 grams, 98%, 2.06 moles) was added to this liquid over a period of thirty minutes. During this addition, the reaction temperature rose to 65 ° C. The resultant yellow solution was heated to reflux to remove water azeotropically. A total of 27.2 grams water was removed after about twelve hours of heating. The resultant yellow liquid was then vacuum stripped to remove excess IBA and low boilers. Further vacuum distillation (148° to 158° C., at 30 to 35 mm Hg) gave a light yellow liquid product.

Example 3

Preparation of Coating Formulation and Determination of Potlife, VOC Content and Cure Response 150 grams of acrylic polyol and 55 grams of a solvent blend (two parts methyl ethyl ketone, one part 5-methyl-2-hexanone, and one part Exxate 600 which is available from Exxon Corporation) were admixed. 24 grams of α,α-4,4-tetramethyl- 2-(methylethyl)-N-(2-methylpropylidene)-3-oxazolidine ethanamine as formed in Example 1 was added to the mixture. 100 grams of polyisocyanate (HDI based) was then admixed with the mixture to form a coating formulation. The viscosity of the coating was determined using a Zahn #3 cup at thirty minute intervals. When the formulation passed through the Zahn #3 cup in a thirty second time period, the potlife of the formulation was reached. The experiment was repeated on two occasions. The first trial resulted in an average potlife of three hours from two experiments. The second trial exhibited an average potlife of two hours and 45 minutes from two experiments.

The volatile organic content of the coating formulation was determined by taking a sample of the formulation immediately after all ingredients were mixed and analyzing the samples following EPA method 24 for reactive systems. The analysis indicated that the reactive diluent reduced the VOC of the coating as compared to a control formulation which did not contain the reactive diluent.

The cure response, which is the time required for a coating film to set, was an average of twelve hours for the first trial and ten and one-half hours for the second trial. The cure response indicates that the coating cures within a suitable time.

Example 4

Preparation of Comparative Coating Formulation and Determination of Potlife, VOC Content and Cure Response 132 grams of acrylic polyol and 50 grams of the solvent blend identified in Example 3 were admixed. 21 grams of 2-(methylethyl)-N-(2-methylpropylidene)-3-oxazolidine ethanamine as described in Example 1 of U.S. Pat. No. 4,504,647 was added to the mixture. 100 grams of polyisocyanate (HDI based) was then admixed with the mixture to form a coating formulation. The viscosity of the coating was determined using a Zahn #3 cup at thirty minute intervals. When the formulation passed through the Zahn #3 cup in a thirty second time period, the potlife of the formulation was reached. This coating formulation exhibited a potlife of 45 minutes.

The volatile organic content of the coating formulation was determined by the method described in Example 3. The analysis indicated that the reactive diluent reduced the VOC of the coating as compared to a control formulation which did not contain the reactive diluent.

The cure response was three hours, indicating that the coating cures within an acceptable time.

The potlife of the coating of Example 3 which includes the reactive diluent compound of the present invention has a potlife which is about four times greater than that of the coating including 2-(methylethyl)-N-(2-methylpropylidene)-3-oxazolidine ethanamine. Although the coating formulation including 2-(methylethyl)-N-(2-methylpropylidene)-3-oxazolidine ethanamine forms a curable, low VOC coating, the potlife of the formulation is unsatisfactory for many commercial applications, such as usage as an automotive refinish coating. The coating including the reactive diluent compound of the invention can be used in these commercial applications because its potlife is significantly longer.

While the invention is susceptible to various modifications and alternative forms, specific embodiments thereof have been shown by way of example and were herein described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

I claim:

1. An aldimine oxazolidine compound having the formula:

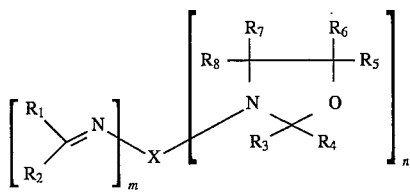

wherein: $R_1$, $R_2$, $R_3$, $R_4$, $R_5$, $R_6$, $R_7$ and $R_8$ are, individually, a hydrogen atom, a methyl or methylol group, an ethyl or ethylol group, a straight chain or branched chain alkyl or alkanol group, a cycloalkyl group, or an aryl group, including any of the above groups substituted by nitro, halogen, thiol and amino functional groups, such that when both $R_7$ and $R_8$ are hydrogen atoms, neither $R_3$ nor $R_4$ are hydrogen atoms; m and n are integers of one to three, and m+n is between two and four; and X is a covalent bond between the nitrogen atom of the aldimine group and the nitrogen atom of the oxazolidine group or an (m+n)-valent methylene group, ethylene group, straight chain or branched chain alkylene group, cycloalkylene group, or arylene group, including any of the above X groups substituted by nitro, halogen, thiol and amino functional groups.

2. The compound of claim 1 wherein $R_1$, $R_3$, $R_7$ and $R_8$ are alkyl groups, $R_2$, $R_4$, $R_5$, and $R_6$ are hydrogen atoms, and m and n equal one.

3. The compound of claim 1 wherein $R_1$ and $R_3$ are 2-propyl groups, $R_2$, $R_4$, $R_5$, and $R_6$ are hydrogen atoms, $R_7$ and $R_8$ are methyl groups, and m and n equal one.

4. The compound of claim 1 wherein X is:

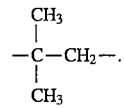

5. The compound of claim 1 wherein $R_5$ and $R_6$ are hydrogen atoms.

6. The compound of claim 1 wherein the aldimine oxazolidine has the formula:

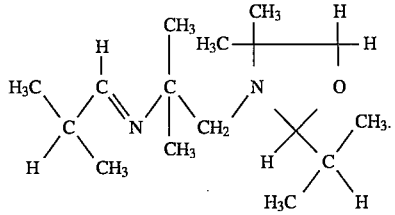

* * * * *